United States Patent
Zhang et al.

(10) Patent No.: US 11,726,658 B2
(45) Date of Patent: Aug. 15, 2023

(54) METHOD, DEVICE, AND COMPUTER PROGRAM PRODUCT FOR STORAGE MANAGEMENT

(71) Applicant: EMC IP Holding Company LLC, Hopkinton, MA (US)

(72) Inventors: Xiaobo Zhang, Beijing (CN); Xinlei Xu, Beijing (CN); Shaoqin Gong, Beijing (CN); Baote Zhuo, Beijing (CN); Shuai Ni, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 139 days.

(21) Appl. No.: 16/751,652

(22) Filed: Jan. 24, 2020

(65) Prior Publication Data
US 2021/0117088 A1    Apr. 22, 2021

(30) Foreign Application Priority Data

Oct. 21, 2019   (CN) .......................... 201911002309.3

(51) Int. Cl.
*G06F 3/06*   (2006.01)
(52) U.S. Cl.
CPC .......... *G06F 3/0604* (2013.01); *G06F 3/0631* (2013.01); *G06F 3/0646* (2013.01); *G06F 3/0689* (2013.01)
(58) Field of Classification Search
CPC ........ G06F 3/06; G06F 3/0604; G06F 3/0631; G06F 3/0646; G06F 3/0689
See application file for complete search history.

(56) References Cited

U.S. PATENT DOCUMENTS

| 8,484,356 B1* | 7/2013 | Douglis ............... G06F 11/3442 709/226 |
| 10,146,624 B1 | 12/2018 | Gong et al. |
| 10,860,260 B2 | 12/2020 | Xu et al. |
| 11,048,416 B2* | 6/2021 | Liu ....................... G06F 3/0631 |

(Continued)

OTHER PUBLICATIONS

Patterson, David; Garth Gibson, Randy Katz. A Case for Redundant Arrays of Inexpensive Disks (RAID). Department of Electrical Engineering and Computer Science, University of California (1988) (Year: 1988).*

(Continued)

*Primary Examiner* — Michael Krofcheck
(74) *Attorney, Agent, or Firm* — BainwoodHuang

(57) ABSTRACT

Techniques involve: determining a first group of storage disks, a use rate of each storage disk of the first group of storage disks exceeding a first threshold, the first group of storage disks comprising a first group of storage blocks corresponding to a first redundant array of independent storage disk (RAID); allocating a second group of storage blocks corresponding to a second RAID from a second group of storage disks, the second group of storage blocks having the same size as that of the first group of storage blocks, a use rate of each storage disk of the second group of storage disks being under a second threshold; moving data in the first group of storage blocks to the second group of storage blocks; and releasing the first group of storage blocks from the first group of storage disks. Thus, use rates of the storage disks become more balanced.

17 Claims, 9 Drawing Sheets

(56) References Cited

U.S. PATENT DOCUMENTS

| | | | | |
|---|---|---|---|---|
| 2007/0233931 A1* | 10/2007 | Tanaka | ................ | G06F 12/0246 |
| | | | | 711/5 |
| 2007/0233952 A1* | 10/2007 | Tanaka | .................... | G06F 3/067 |
| | | | | 711/114 |
| 2015/0193154 A1* | 7/2015 | Gong | .................... | G06F 3/0608 |
| | | | | 711/103 |
| 2018/0032259 A1* | 2/2018 | Yook | ........................ | G06F 3/048 |

OTHER PUBLICATIONS https://en.wikipedia.org/wiki/Standard_RAID_levels (retrieved Jun. 28, 2021). (Year: 2021).*

Taylor, Christine. RAID Levels Explained. Enterprise Storage Forum (May 3, 2019) (https://www.enterprisestorageforum.com/management/raid-levels-explained/) (Year: 2019).*

* cited by examiner

METHOD, DEVICE, AND COMPUTER PROGRAM PRODUCT FOR STORAGE MANAGEMENT

CROSS-REFERENCE TO RELATED APPLICATION

This application claims priority to Chinese Patent Application No. CN201911002309.3, on file at the China National Intellectual Property Administration (CNIPA), having a filing date of Oct. 21, 2019, and having "METHOD, DEVICE AND COMPUTER PROGRAM PRODUCT FOR STORAGE MANAGEMENT" as a title, the contents and teachings of which are herein incorporated by reference in their entirety.

TECHNICAL FIELD

Embodiments of the present disclosure relate to the field of computers, and more specifically to a method, a device, and a computer program product for storage management.

BACKGROUND

In a storage system based on a redundant array of independent storage disks (RAID), if a storage disk fails, the storage system may recover data in the failing disk using data in other storage disks. However, when the storage disk group constituting the RAID changes (e.g., adding or reducing a disk), the use rate of each storage disk may be greatly different, such that IO and wear of each storage disk may be different, and the storage space that can be provided to users is restricted.

SUMMARY OF THE INVENTION

Embodiments of the present disclosure provide a scheme for storage management.

According to a first aspect of the present disclosure, a method for storage management is presented. The method includes: determining a first group of storage disks from a plurality of storage disks, a use rate of each storage disk of the first group of storage disks being higher than a first threshold, the first group of storage disks including a first group of storage blocks corresponding to a first redundant array of independent storage disks (RAID); allocating a second group of storage blocks corresponding to a second RAID from a second group of storage disks of the plurality of storage disks, the second group of storage blocks having the same size as that of the first group of storage blocks, a use rate of each storage disk of the second group of storage disks being less than a second threshold; moving data in the first group of storage blocks to the second group of storage blocks; and releasing the first group of storage blocks from the first group of storage disks.

According to a second aspect of the present disclosure, a device for storage management is presented. The device includes: at least one processing unit; and at least one memory, the at least one memory being coupled to the at least one processing unit and storing instructions to be executed by the at least one processing unit, the instructions, when executed by the at least one processing unit, causing the device to execute an action, the action including: determining a first group of storage disks from a plurality of storage disks, a use rate of each storage disk of the first group of storage disks being higher than a first threshold, the first group of storage disks including a first group of storage blocks corresponding to a first redundant array of independent storage disks (RAID); allocating a second group of storage blocks corresponding to a second RAID from a second group of storage disks of the plurality of storage disks, the second group of storage blocks having the same size as that of the first group of storage blocks, a use rate of each storage disk of the second group of storage disks being less than a second threshold; moving data in the first group of storage blocks to the second group of storage blocks; and releasing the first group of storage blocks from the first group of storage disks.

In a third aspect of the present disclosure, a computer program product is provided. The computer program product is stored in a non-transitory computer storage medium and includes machine-executable instructions. The machine-executable instructions, when running in a device, cause the device to execute any step of the method according to the first aspect of the present disclosure.

The part of Summary of the Invention is provided to introduce selection of concepts in a simplified form, which will be further described in the Detailed Description below. The part of Summary of the Invention is neither intended to identify key features or essential features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

DETAILED DESCRIPTION

Figure 1:
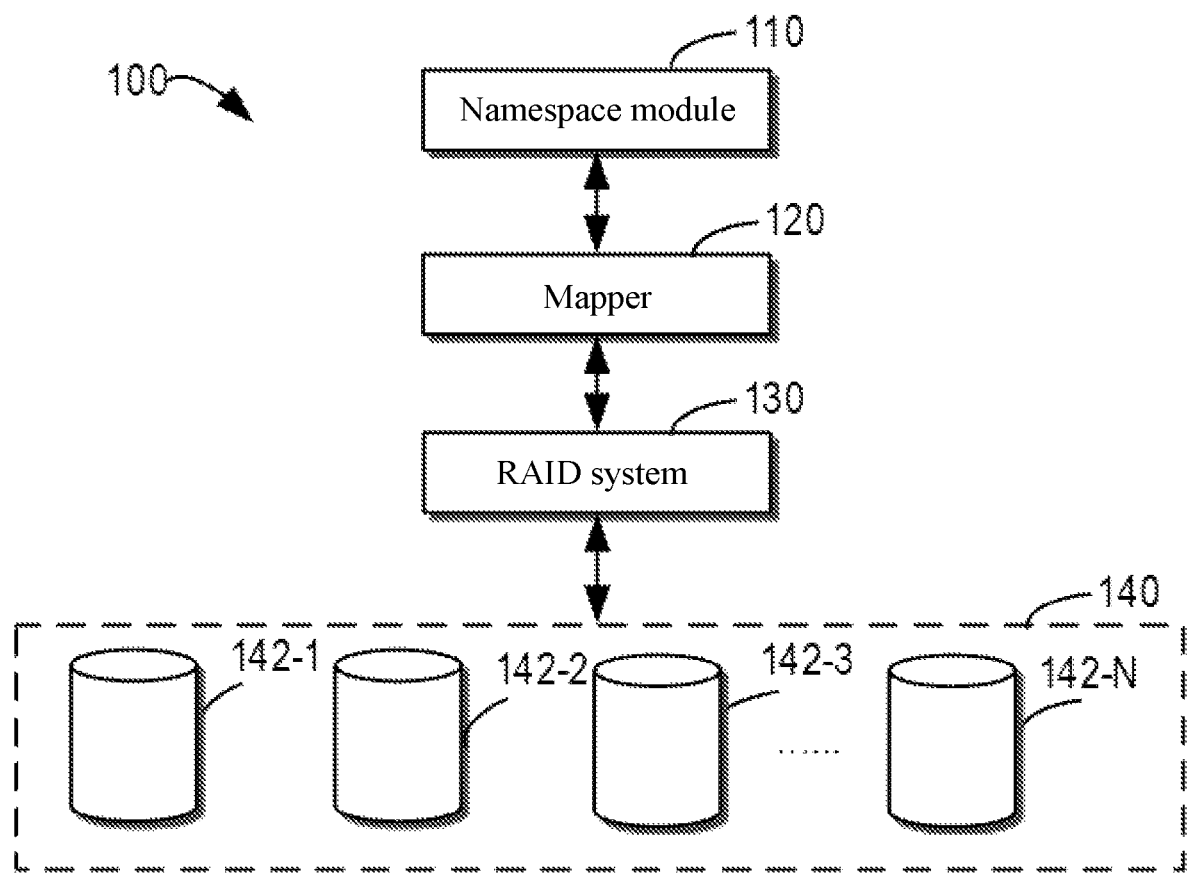
FIG. 1 illustrates a schematic diagram of an example storage system in which embodiments of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. The preferred embodiments of the present disclosure are shown in the accompanying drawings. However, it should be understood that the present disclosure can be implemented in various forms and should not be limited to the embodiments set forth herein. In contrast, these embodiments are provided to make the present disclosure more thorough and complete, and fully convey the scope of the present disclosure to those skilled in the art.

The term "including" and variants thereof used herein indicate open-ended inclusion, i.e., "including, but not limited to." Unless specifically stated, the term "or" indicates "and/or." The term "based on" indicates "based at least in part on." The terms "an exemplary embodiment" and "an embodiment" indicate "at least one example embodiment." The term "another embodiment" indicates "at least one additional embodiment." The terms "first," "second," and the like may refer to different or identical objects. Other explicit and implicit definitions may be further included below.

In a RAID-based storage system, one RAID may include storage blocks from a plurality of storage disks. The plurality of storage disks may also constitute a plurality of independent RAIDs. In a RAID-based data recovery process, data of a target storage block may be recovered by using other storage blocks in the same RAID. In order to minimize the risk caused by storage disk failure, the RAID-based storage system always expects that storage blocks in a plurality of RAIDs may be equally distributed to the storage disks, thus minimizing the influence of failure of one storage disk. However, when trash recycling is performed on the storage system or when a new storage disk is added to the storage system, distribution of storage blocks of the plurality of RAIDs in the storage system may be imbalanced. To better understand the process of storage management according to embodiments of the present disclosure, a basic architecture of the RAID-based storage system will be first introduced below.

FIG. 1 shows a schematic diagram of an example storage system 100 in which embodiments of the present disclosure may be implemented. As shown in FIG. 1, storage system 100 includes hardware storage pool 140, which includes a plurality of storage disks 142-1,142-2,142-3, . . . , 142-N (N is an integer greater than or equal to 1), and the like for providing a physical storage space of storage system 100. To facilitate discussion, these storage disks are sometimes referred to collectively or individually as storage disk 142. Storage disk 142 may include various types of devices having a storage function, including but not limited to a hard disk drive (HDD), a solid state disk (SSD), a removable disk, a compact disk (CD), a laser disk, an optical disk, a digital versatile disk (DVD), a floppy disk, a blu-ray disk, a serial attached small computer system interface (SCSI) storage disk (SAS), a serial advanced technology attachment (SATA) storage disk, any other magnetic storage device, any other optical storage device, or any combination thereof.

RAID system 130 in storage system 100 is established based on a plurality of storage disks 142, to organize the physical storage space of storage disk 142 using a RAID algorithm. RAID system 130 provides a flat physical address space for mapper 120 to map the storage space of the storage system 100. Mapper 120 is configured to manage mapping between physical addresses and logical addresses of storage system 100. Mapper 120 provides a flat linear logical address space for namespace module 110. Namespace module 110 uses the logical address space provided by the mapper and can invoke an application program interface (API) of mapper 120 to obtain a mapping from the logical address to the physical address. When performing an I/O operation on storage system 100, an I/O request from a user is received by namespace module 110 and is sent to mapper 120. Mapper 120 searches for a physical address of data to which the I/O request is specific (an address into which the data is written or an address from which the data is read), and initiates an I/O to RAID system 130, such that RAID system 130 performs an actual I/O operation on a back-end storage disk.

It should be understood that FIG. 1 only schematically shows units, modules, or components related to the embodiments of the present disclosure in storage system 100. Each component shown in FIG. 1 is merely an example storage system management architecture, and in other RAID-based storage systems, there may be other architecture divisions, other units, modules, or components for other functions, and the like. Accordingly, the embodiments of the present disclosure are not limited to the specific devices, units, modules, or components depicted in FIG. 1, and are generally adapted for any storage system based on the RAID technology.

Figure 2:
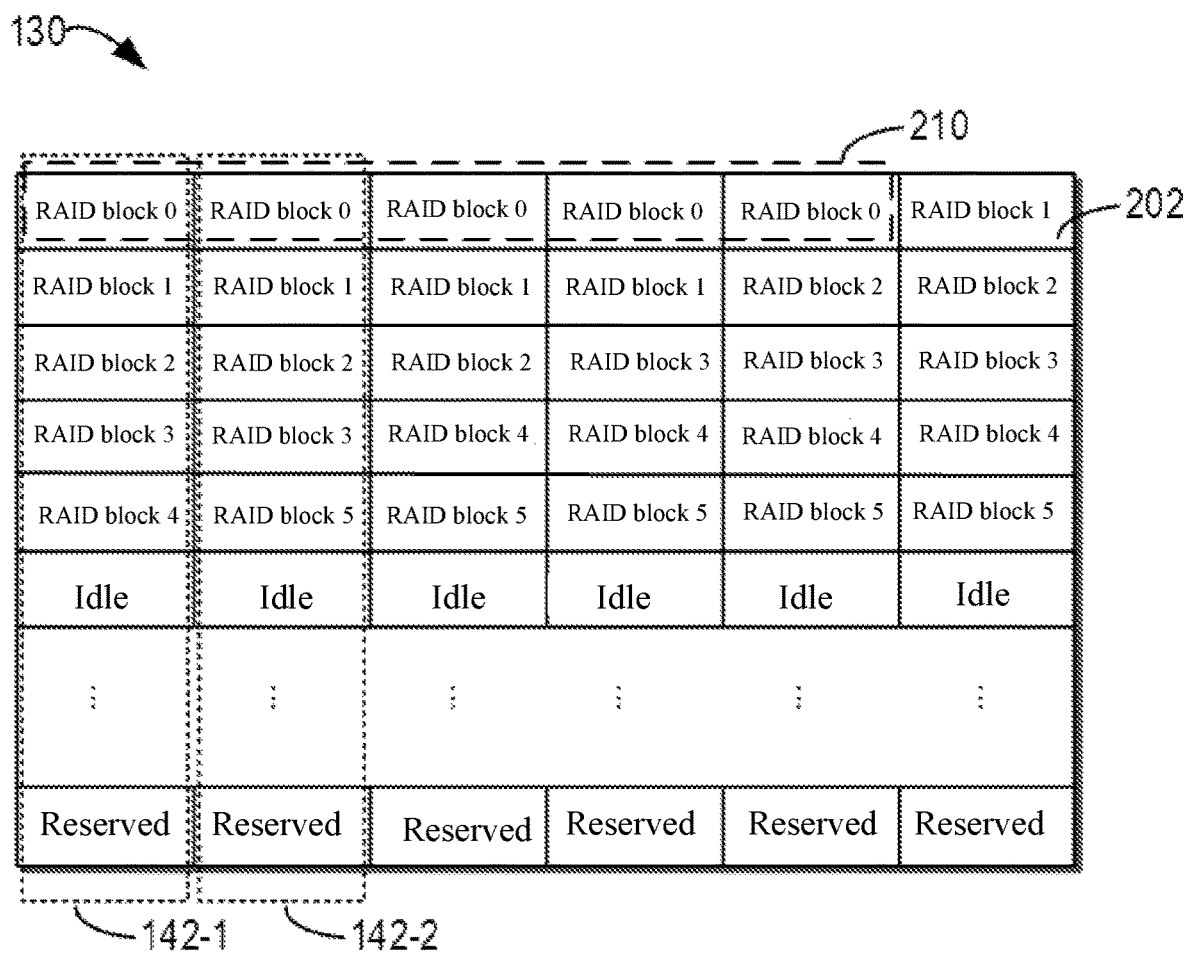
FIG. 2 illustrates a schematic diagram of a RAID composed of a plurality of storage blocks from a plurality of storage disks according to an embodiment of the present disclosure.

In a RAID-based storage system, physical storage disk 142 may be organized using various RAID algorithms, including a traditional RAID algorithm and an architecture currently referred to as RAID 2.0. To better understand the RAID-based storage system, FIG. 2 shows an example structure of a RAID system 130. As shown in FIG. 2, storage disk 142 is divided into a plurality of storage blocks 202, which are also referred to as a plurality of disk extents or a plurality of disk slices 202. Such a division may be a logical division. A size of storage block 202 depends on a size and a division of the storage disk. In some examples, the size of storage block 202 may be at a gigabyte level. Of course, other sizes of the storage block are also possible based on actual deployment requirements.

RAID system 130 is created with storage block 202 as a unit. In some dynamically allocated storage systems, when RAID system 130 is initially created, all storage blocks are idle. As data is written, when the capacity of the RAID is found to be insufficient, RAID system 130 will select a plurality of storage blocks 202 from different storage disks 142 with a certain algorithm and constitute RAID block 210 of RAID system 130 with these storage blocks 202. Such RAID block 210 may be considered as a small-sized RAID, because I/O access and management of RAID block 210 are similar to those of a conventional RAID.

Storage block 202 may be selected from the plurality of storage disks 142 with any suitable algorithm, such as a round-robin algorithm, or a weighted round-robin algorithm. The number of storage blocks included in each RAID 210 depends on the RAID type, so that different levels of data redundancy and recovery capability are provided. The RAID type includes RAID 2, RAID 3, RAID 4, RAID 5, RAID 6, RAID 7, RAID 10, and the like. In FIG. 2 and hereinafter, for the purpose of explanation, example embodiments of the present disclosure are discussed based on the RAID 5 type. However, it should be understood that the example embodiments of the present disclosure may be similarly applied to any other type of RAID.

In FIG. 2, based on the RAID 5 type, each RAID block 210 includes five storage blocks from different storage disks 142. As mentioned above, a new RAID block 210 may be continuously allocated based on data write-in requirements, such that the capacity of RAID system 130 achieves dynamic growth. FIG. 2 shows five allocated RAID blocks 210 (i.e., RAID block 0 to RAID block 5). In FIG. 2, a corresponding RAID block to which the storage block is allocated is marked with "RAID block 0," "RAID block 1," "RAID block 2," "RAID block 3," "RAID block 4," or "RAID block 5" in each storage block 202. Storage block 202 that is not selected for use as a RAID block in each storage disk 142 is considered as idle storage block 202 and is marked with "idle."

In some embodiments, one or more storage blocks 202 (marked with "reserved") may be further reserved in each storage disk 142 for data reconstruction in case of disk failure. For example, if storage disk 142 fails, storage blocks 202 of storage disk 142 are all marked as failure, suggesting that RAID blocks 210 established based on these storage blocks 202 are also affected. Storage system 100 may start a reconstruction process, use the reserved storage blocks 202 to replace the storage blocks marked as failure in RAID blocks 210, and reconstruct data/information in the storage blocks marked as failure into the reserved storage blocks 202. Based on the reconstruction algorithm, the reconstruction process may be started within a period of time after the disk failure. The embodiments of the present disclosure are not limited in this respect.

Figure 3:
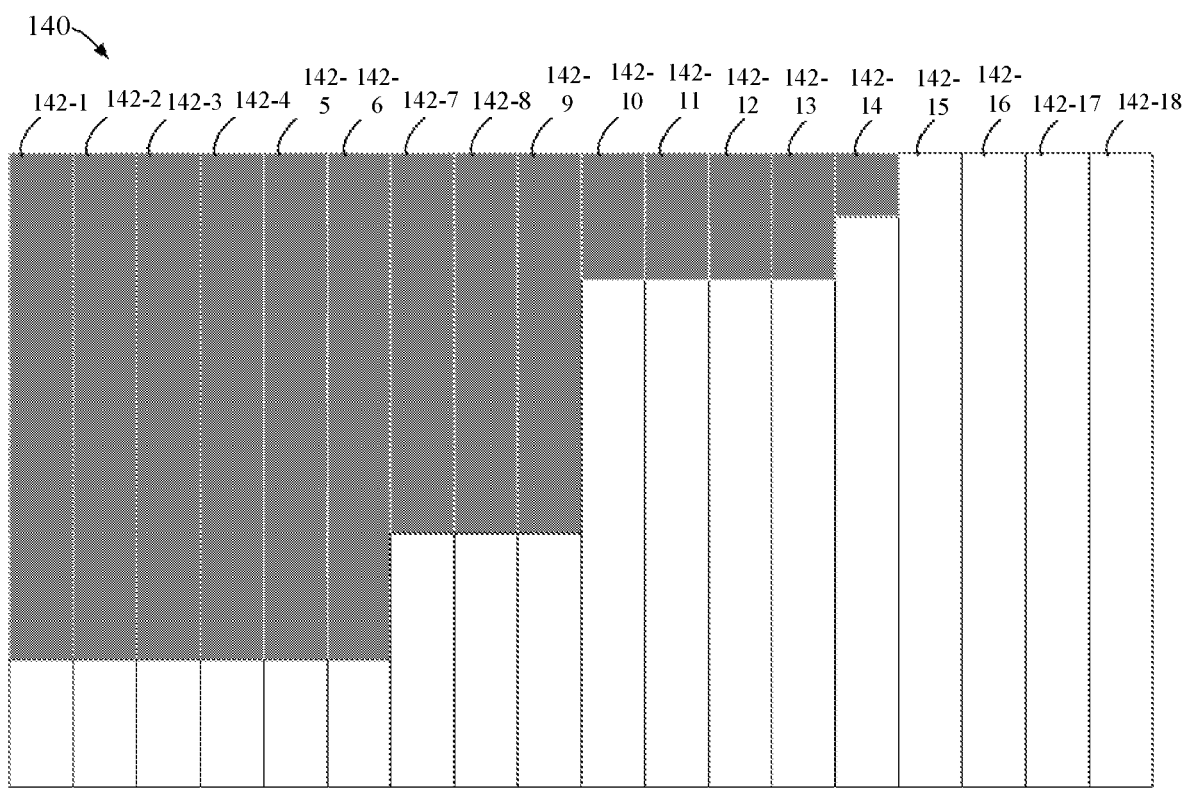
FIG. 3 illustrates a schematic diagram of an example storage pool according to an embodiment of the present disclosure.

FIG. 3 shows an example storage pool 140 according to an embodiment of the present disclosure. As shown in FIG. 3, the example storage pool 140 includes a plurality of storage disks 142-1 to 142-18, where shaded portions denote used storage space of each storage disk. As can be seen, the distribution of use rates of the plurality of storage disks 142-1 to 142-18 is large. It should be understood that the number and specific use rates of the storage disks shown in FIG. 3 are merely illustrative and are not intended to limit the present disclosure. In the present disclosure, "use rate" denotes a proportion of occupied spaces in the storage disk. As discussed above, due to imbalanced use rates, IO and wear of each storage disk may be different, and the storage space that can be provided to users is restricted.

According to an embodiment of the present disclosure, a scheme for storage management is provided. In the scheme, a first group of storage disks is first determined from a plurality of storage disks, where a use rate of each storage disk of the first group of storage disks is higher than a first threshold, and the first group of storage disks includes a first group of storage blocks corresponding to a first redundant array of independent storage disks (RAID). Then, a second group of storage blocks corresponding to a second RAID may be allocated from a second group of storage disks of the plurality of storage disks, where the second group of storage blocks has the same size as that of the first group of storage blocks, and a use rate of each storage disk of the second group of storage disks is less than a second threshold. Then, data in the first group of storage blocks are moved to the second group of storage blocks, and the first group of storage blocks is released from the first group of storage disks. In this way, the embodiments of the present disclosure can further adjust a plurality of storage disks, such that the use rates of the plurality of storage disks are more balanced, thereby improving the stability of the storage system.

Figure 4:
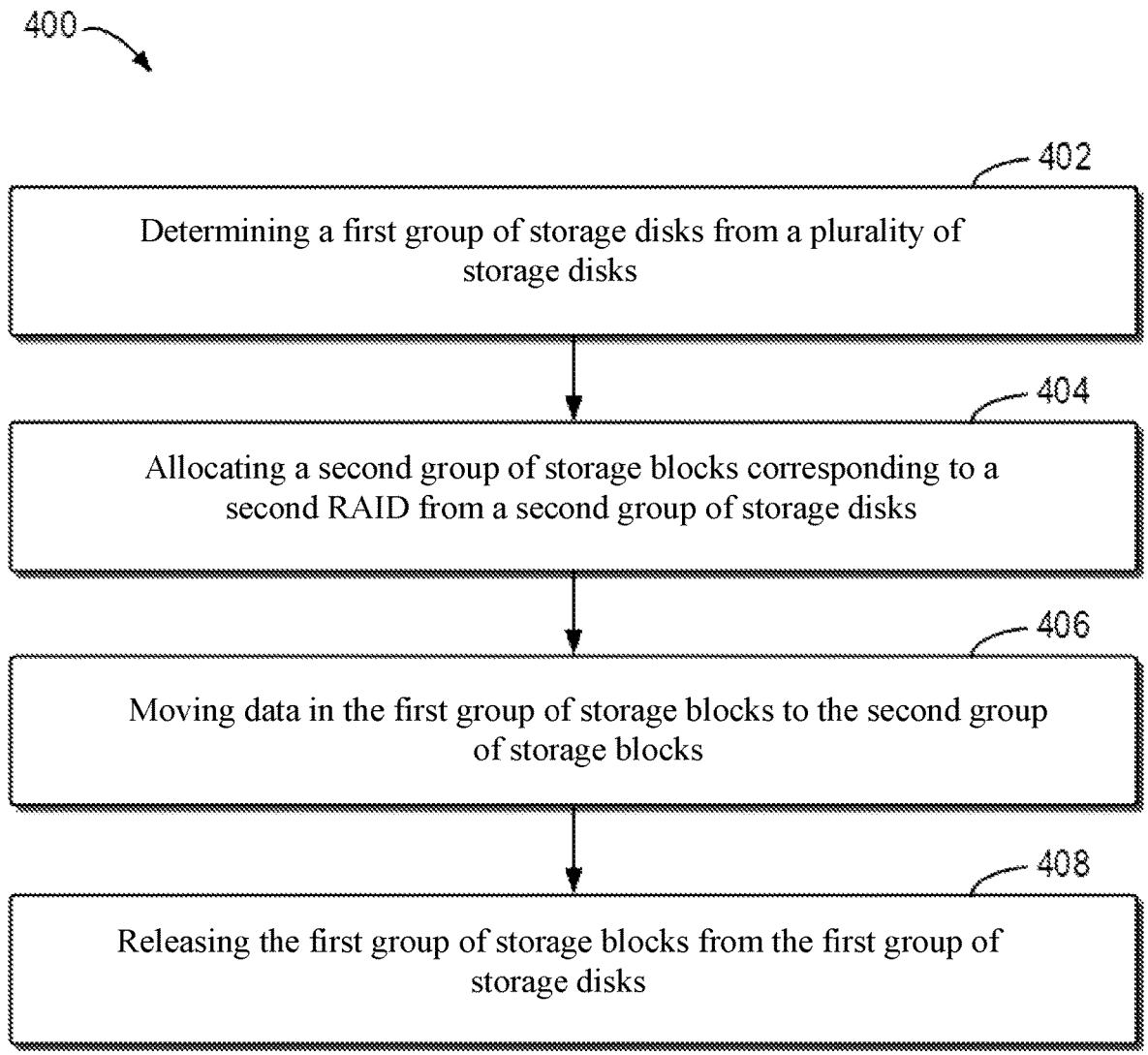
FIG. 4 illustrates a flowchart of a method for storage management according to an embodiment of the present disclosure.

A process of storage management according to an embodiment of the present disclosure will be described below with reference to FIG. 4 to FIG. 8. FIG. 4 shows a flowchart of method 400 for storage management according to some embodiments of the present disclosure. A process of method 400 will be described below with reference to FIG. 1 to FIG. 3. Method 400, e.g., may be implemented by storage system 100 in FIG. 1.

As shown in FIG. 4, in block 402, storage system 100 determines a first group of storage disks from a plurality of storage disks, a use rate of each storage disk of the first group of storage disks is higher than a first threshold, and the first group of storage disks includes a first group of storage blocks corresponding to a first redundant array of independent storage disks (RAID).

Taking the plurality of example storage disks 142 of FIG. 3 as an example, storage system 100 may first determine the first group of storage disks with a use rate higher than the first threshold from the plurality of storage disks 142. In some embodiments, the first threshold, e.g., may be determined to be an average use rate of the plurality of storage disks 142. Thus, storage system 100 may determine the first group of storage disks including storage disk 142-1 to storage disk 142-9 from the plurality of storage disks 142. Their use rates are higher than the average use rate of the plurality of storage disks 142.

Figure 5:
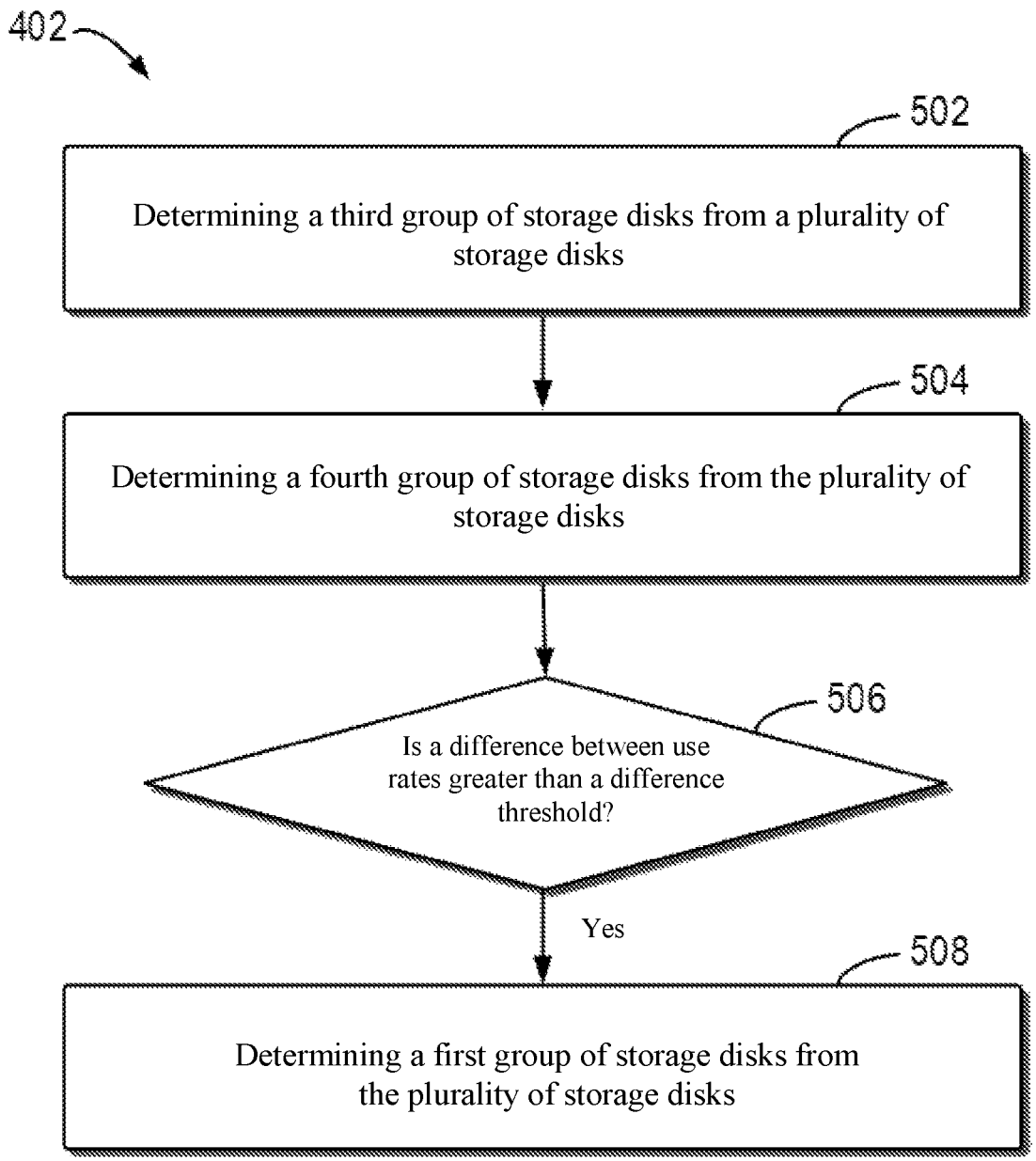
FIG. 5 illustrates a flowchart of an example method of determining a first group of storage disks according to an embodiment of the present disclosure.

In some embodiments, storage system 100 may not determine the first group of storage disks until determining that a difference between the use rates of the plurality of storage disks is large enough. A detailed process of block 402 will be described below in conjunction with FIG. 5. FIG. 5 shows a flowchart of an example method of determining the first group of storage disks according to an embodiment of the present disclosure.

As show in FIG. 5, in block 502, storage system 100 may determine a third group of storage disks from a plurality of storage disks, where the number of storage disks of the third group of storage disks is identical to the number of reference storage disks corresponding to a first RAID, and a use rate of the third group of storage disks is higher than a third threshold. For example, a RAID deployed in the plurality of storage disks 142 is RAID 5, a width of which is 5, i.e., it is necessary to constitute the RAID using storage blocks in 5 storage disks. In the example, the number of reference storage disks is determined to be 5.

In some embodiments, storage system 100 may first rank the plurality of storage disks 142 based on the use rates of the plurality of storage disks 142 and select 5 storage disks with the highest use rates for use as the third group of storage disks. For the example of FIG. 3, storage system 100, e.g., may determine storage disks 142-1 to 142-5 as the third group of storage disks.

In block 504, storage system 100 may further determine a fourth group of storage disks from the plurality of storage disks, the number of storage disks of the fourth group of storage disks is identical to the number of reference storage disks, and a use rate of the fourth group of storage disks is lower than a fourth threshold. Similarly, storage system 100, e.g., may select 5 storage disks 142-14 to 142-18 with the lowest use rates from the plurality of ranked storage disks 142 for use as the fourth group of storage disks.

In block 506, storage system 100 may determine whether a difference between an average use rate of the third group of storage disks and an average use rate of the fourth group of storage disks is greater than a difference threshold. In response to determining that the difference is greater than the difference threshold in block 406, the method proceeds to block 408, i.e., storage system 100 may determine a first group of storage disks from the plurality of storage disks. For the example of FIG. 3, the average use rate of the third group of storage disks 142-1 to 142-5 is, for example, 80%, the average use rate of the fourth group of storage disks 142-14 to 142-18 is 2%. Thus, storage system 100 may determine that the use rates of the plurality of storage disks 142 are imbalanced. Accordingly, the first group of storage disks 142-1 to 142-9 may be determined based on the above described method. In this way, computing device 120 may start a process of adjusting storage disks only after determining that the use rates of the plurality of storage disks are sufficiently imbalanced, thereby avoiding unnecessary adjustment costs.

Figure 6:
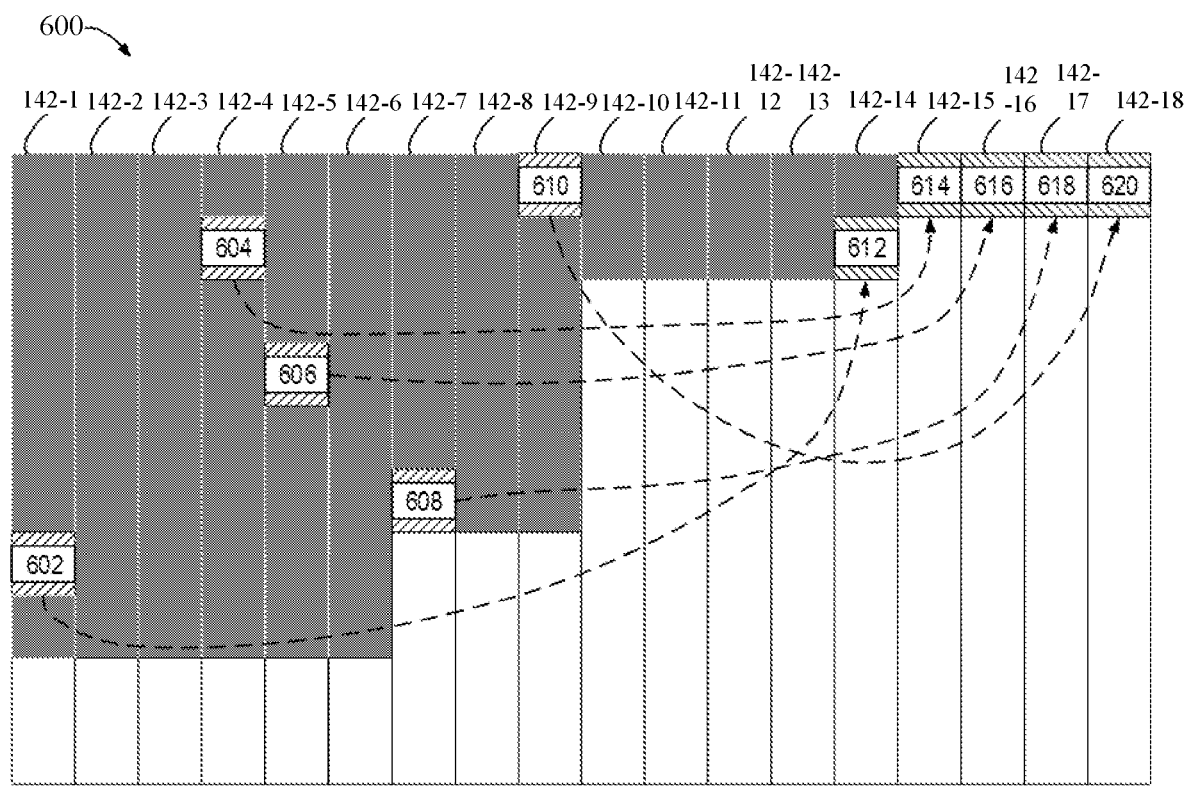
FIG. 6 illustrates a schematic diagram of a process of adjusting a plurality of storage disks according to an embodiment of the present disclosure.

Furthermore, storage system 100 may determine a first group of storage blocks from the first group of storage disks. The first group of storage blocks are all located in the first group of storage disks and constitute a RAID (referred to a first RAID to facilitate description). FIG. 6 shows schematic diagram 600 of adjusting a plurality of storage disks according to an embodiment of the present disclosure. As shown in FIG. 6, storage system 100 may determine storage block 602, storage block 604, storage block 606, storage block 608, and storage block 610 (shown by left slashes in the figure) as the first group of storage blocks, which are located in the first group of storage disks 142-1 to 142-9, and constitute a first RAID of the RAID 5 type.

In contrast, when determining that the difference between the average use rate of the third group of storage disks and the average use rate of the fourth group of storage disks is less than or equal to the difference threshold in block 506, storage system 100, e.g., may not perform method 200 (not shown in the figure) any more, but may perform the adjustment on storage blocks in accordance with the method described below with reference to FIG. 7. Furthermore, it should be understood that both the specific RAID type and specific use rate in the above examples are by way of example only.

Still referring to FIG. 4, in block 404, storage system 100 allocates a second group of storage blocks corresponding to a second RAID from a second group of storage disks of the plurality of storage disks, where the second group of storage blocks has the same size as that of the first group of storage blocks, and a use rate of each storage disk of the second group of storage disks is less than a second threshold. In some embodiments, the second threshold may be set to be the same as the first threshold. Alternatively, the second threshold may also be set to be less than the first threshold. As shown in FIG. 6, taking the second threshold set as the average use rate of the plurality of storage disks 142 as an example, storage system 100, e.g., may determine storage disks 142-10 to 142-18 as the second group of storage disks.

Then, storage system 100 may allocate the second group of storage blocks from the determined second group of storage disks. Specifically, storage system 100, e.g., may create a new RAID (referred to a second RAID to facilitate description) in the second group of storage disks to apply for the second group of storage blocks. Taking FIG. 6 as an example, the storage system, e.g., may allocate storage block 612, storage block 614, storage block 616, storage block 618, and storage block 620 (shown by right slashes in the figure) for use as the second group of storage blocks, which will constitute a new second RAID. As can be seen from the figure, the second group of storage blocks are located in different storage disks 142-14 to 142-18, respectively. In some embodiments, storage system 100, e.g., may preferably select a storage disk with a lower use rate from the second group of storage disks to allocate the second group of storage blocks.

Still referring to FIG. 4, in block 406, storage system 100 moves data in the first group of storage blocks to the second group of storage blocks. Specifically, taking FIG. 6 as an example, storage system 100, e.g., may move data in storage block 602 to storage block 612, move data in storage block 604 to storage block 614, move data in storage block 606 to storage block 616, move data in storage block 608 to storage block 618, and move data in storage block 610 to storage block 622. In this way, storage system 100 may copy data in the first RAID to the second RAID.

In block 408, storage system 100 releases the first group of storage blocks from the first group of storage disks. After completing the copying of data, storage system 100 may release the first group of storage blocks to release the first RAID. By moving data in the first group of storage disks with high use rates to the second group of storage disks with low use rates, the embodiments of the present disclosure may reduce use rates of the storage disks in the first group of storage disks, and increase use rates of the storage disks in the second group of storage disks, such that the use rates of the plurality of storage disks are more balanced.

In some embodiments, storage system 100 may iteratively execute the process of method 400 to achieve balanced use rates of the plurality of storage disks by moving the RAID integrally. By adjustment preferably based on RAID, the embodiments of the present disclosure improve the adjustment efficiency compared with the conventional method of adjustment based on storage blocks. For example, for the RAID 5 type, 5 times of separate computing and moving are required for conventional adjustment based on storage blocks, while the embodiments of the present disclosure can integrally move the 5 storage blocks included in the entire RAID only by computing once.

In some embodiments, storage system 100 can further continue to adjust the plurality of storage disks by restriping. A process of restriping according to an embodiment of the present disclosure will be described below with reference to FIG. 7. FIG. 7 shows a flowchart of method 700 for restriping according to an embodiment of the present disclosure.

Figure 7:
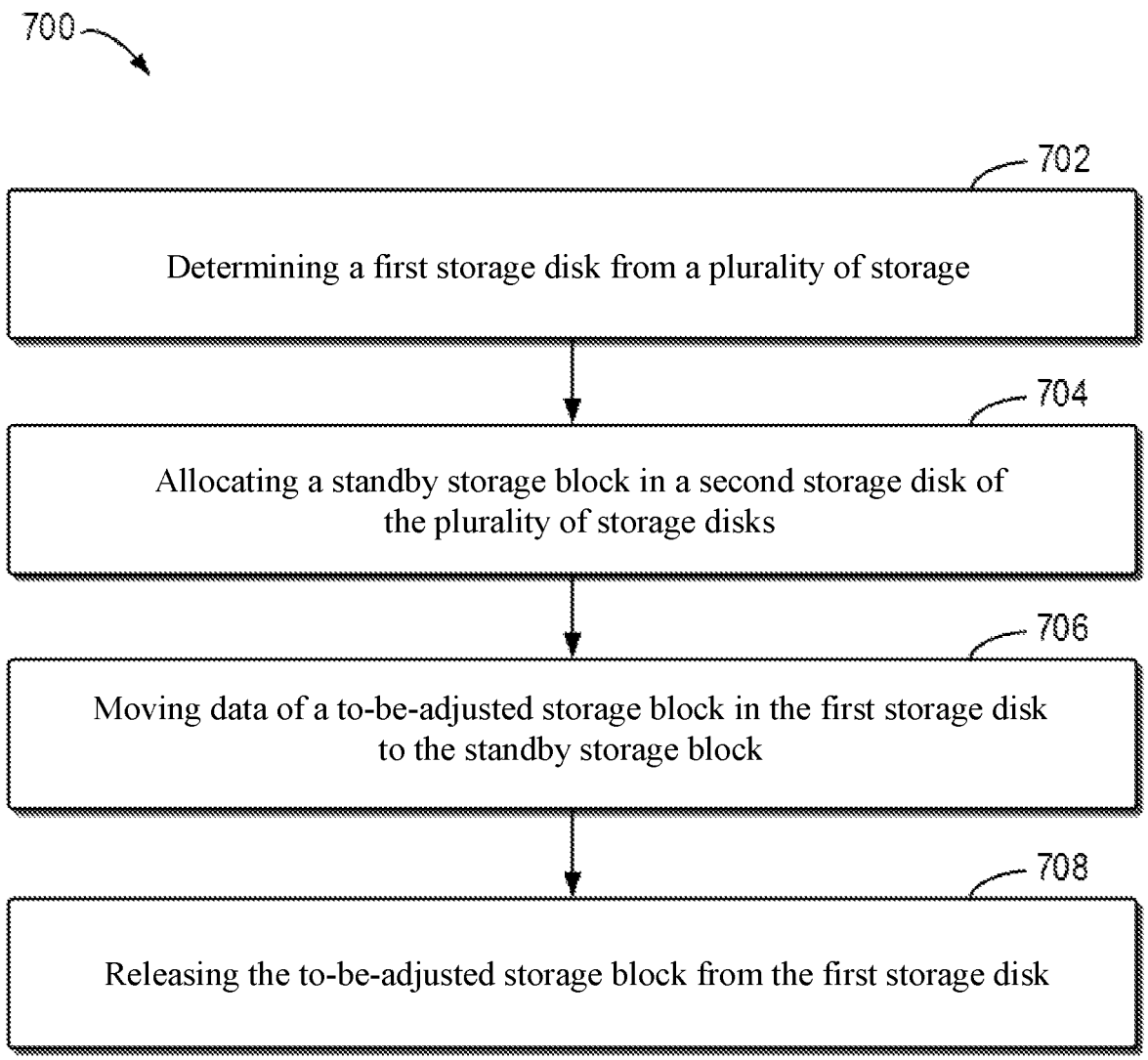
FIG. 7 illustrates a flowchart of an example process of restriping according to an embodiment of the present disclosure.
Figure 8:
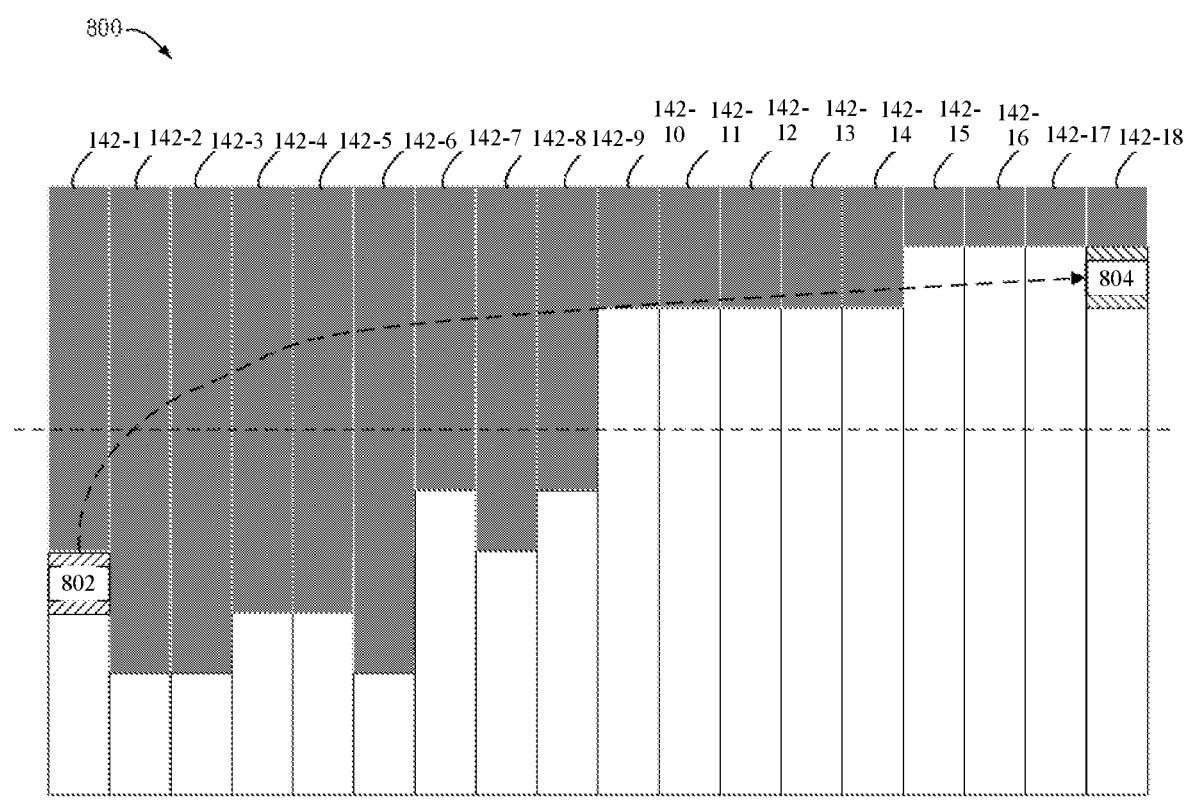
FIG. 8 illustrates a schematic diagram of an example process of restriping according to an embodiment of the present disclosure.

As shown in FIG. 7, in block 702, storage system 100 may determine a first storage disk from a plurality of storage disks. A use rate of the first storage disk is higher than a preset target use rate. Taking FIG. 8 as an example, the plurality of adjusted storage disks 142 have updated use rates. In some embodiments, the target use rate, e.g., may be set as an average use rate of the plurality of storage disks. Accordingly, the storage system, e.g., may determine storage disk 142-1 from the plurality of storage disks. The storage disk is adapted for a use rate higher than the preset target use rate.

In some embodiments, only when storage system 100 determines failure to optimize the plurality of storage disks based on movement of the entire RAID, does storage system 100 determine the first storage disk. Specifically, storage system 100 may determine a fifth group of storage disks from the plurality of storage disks adjusted based on RAID one or more times, where a use rate of each storage disk of the fifth group of storage disks is higher than the first threshold. For example, taking FIG. 6 as an example, storage system 100 may determine storage disks 142-1 to 142-9 as the fifth group of storage disks.

Then, storage system 100 may determine whether there is a third RAID associated with the fifth group of storage disks, where each storage block of a group of storage blocks corresponding to the third RAID is located in the fifth group of storage disks. Only when determining that there is no third RAID associated with the fifth group of storage disks, does storage system 100 determine the first storage disk from the plurality of storage disks. For example, when storage system 100 determines that the storage blocks in the fifth group of storage disks do not constitute a completed third RAID, storage system 100 may determine failure to adjust the plurality of storage disks 142 based on movement of the entire RAID. Thus, storage system 100 may start a storage block-based adjustment and determine that the first storage disk is storage disk 142-1 with a use rate greater than the average use rate.

Still referring to FIG. 7, in block 704, storage system 100 may allocate a standby storage block in a second storage disk of the plurality of storage disks, where a use rate of the second storage disk is lower than the target use rate. Taking FIG. 8 as an example, the storage system 100 may determine second storage disk 142-18 with a use rate lower than the target use rate (e.g., the average use rate), and allocate standby storage block 804 therefrom (shown by right slashes in the figure).

In block 706, storage system 100 may move data of a to-be-adjusted storage block in the first storage disk to the standby storage block. Taking FIG. 8 as an example, storage system 100 may determine the to-be-adjusted storage block 802 (shown by left slashes in the figure) from storage system 100 and copy the data of to-be-adjusted storage block 802 to standby storage block 804. In some embodiments, to-be-adjusted storage block 802, e.g., is associated with a fourth RAID. After completing the copying, storage system 100 may further associate standby storage block 802 with the fourth RAID and disassociate to-be-adjusted storage block 802 from the fourth RAID.

In block 708, storage system 100 may release the to-be-adjusted storage block from the first storage disk. In this way, storage system 100 may move, with a storage block as a unit, data in storage disks with use rates, e.g., higher than the average use rate to storage disks with use rates lower than the average use rate, such that use rates of the plurality of storage disks are more balanced.

It should be understood that the storage system may further iteratively execute method 700, such that use rates of the plurality of storage blocks are balanced as far as possible. In some embodiments, storage system 100 may terminate adjusting the use rates of the plurality of storage disks when determining that a difference between a use rate of any storage disk of the plurality of storage disks and the average use rate of the plurality of storage disks fails to reach a preset threshold.

In some embodiments, storage system 100 may further determine the total number of storage blocks that need to be adjusted such that the use rates of the plurality of storage disks are basically balanced. For example, storage system 100 may determine the average number of used storage blocks of the plurality of storage disks, and determine the number of used storage blocks exceeding the average number of used storage blocks of each storage disk of the plurality of storage disks, to determine the total number of to-be-adjusted storage blocks. For example, assuming that the average number of used storage blocks is 5, and three storage disks of the plurality of storage disks have more than 5 used storage blocks (e.g., 10, 9, and 8 used store blocks, respectively), then in the example, storage system 100 may determine that the number of to-be-adjusted storage blocks is (10−5)+(9−5)+(8−5)=12.

Furthermore, storage system 100 may further update the total number of storage blocks that still need to be adjusted after each adjustment, determine a progress of completed adjustment based on the number of adjusted storage blocks, and provide the progress to a user, such that the user can more intuitively know about a progress of adjusting the plurality of storage disks. For example, assuming that there are 7 storage blocks still need to be adjusted after a number of adjustments, then the storage system 100, e.g., may determine that a completion progress is (12−7)/12=41.67%. In some examples, storage system 100, e.g., may present a current completion progress to the user via a progress bar.

Figure 9:
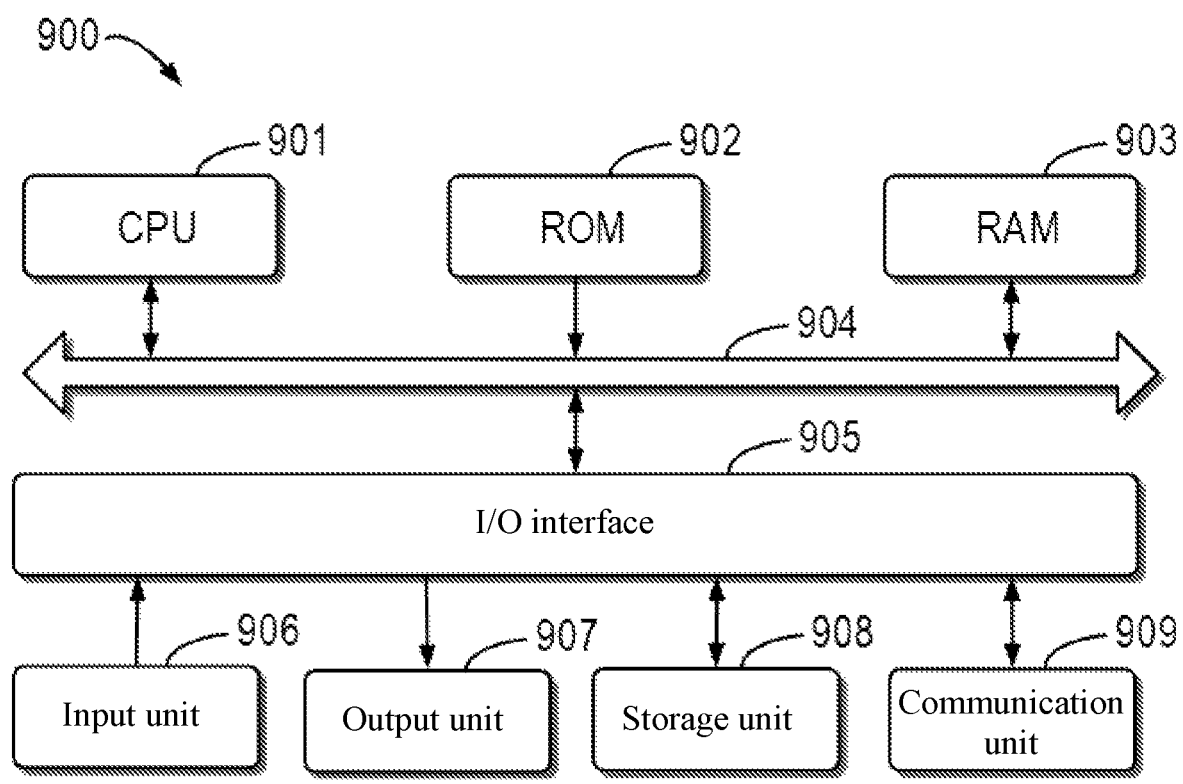
FIG. 9 illustrates a schematic block diagram of an example device that may be configured to implement embodiments of the present disclosure.

FIG. 9 shows a schematic block diagram of an example device 900 that may be configured to implement embodiments of the present disclosure. For example, storage system 100 according to the embodiments of the present disclosure may be implemented by device 900. As shown in the figure, device 900 includes central processing unit (CPU) 901, which may execute various appropriate actions and processing in accordance with computer program instructions stored in read-only memory (ROM) 902 or computer program instructions loaded onto random access memory (RAM) 903 from storage unit 908. RAM 903 may further store various programs and data required for operations of device 900. CPU 901, ROM 902, and RAM 903 are connected to each other through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices via a computer network such as the Internet and/or various telecommunication networks.

The processes and processing described above, such as method 400 and/or method 700, may be executed by processing unit 901. For example, in some embodiments, method 400 and/or method 700 may be embodied as a computer software program that is tangibly included in a machine-readable medium, such as storage unit 908. In some embodiments, some of or all the computer program can be loaded and/or installed onto device 900 via ROM 902 and/or communication unit 909. When the computer program is loaded into RAM 903 and executed by CPU 901, one or more actions of method 400 and/or method 700 described above may be executed.

Embodiments of the present disclosure may refer to methods, apparatus, systems, and/or a computer program products. In accordance with certain embodiments, the storage system 100 includes data storage equipment which performs I/O operations on behalf of one or more host computers or hosts. The computer program product may include a computer-readable storage medium with computer-readable program instructions for executing various aspects of the present disclosure loaded therein.

The computer-readable storage medium may be a tangible device that can retain and store instructions used by an instruction executing device. Examples of the computer-readable storage medium may include, but are not limited to: an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punched card or an in-groove raised structure with instructions stored thereon, and any suitable combination thereof. The computer-readable storage medium used herein is not construed as transient signals themselves, such as radio waves or other freely propagated electromagnetic waves, electromagnetic waves propagated through a waveguides or other transmission media (e.g., optical pulses through fiber-optic cables), or electrical signals transmitted through wires.

The computer-readable program instructions described here can be downloaded from a computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions such that the computer-readable program instructions are stored in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++, and also include conventional procedural programming languages such as the "C" language or similar programming languages. The computer-readable program instructions can be executed entirely on a user computer, partly on the user computer, as a separate software package, partly on the user computer and partly on a remote computer, or entirely on the remote computer or a server. In the case where a remote computer is involved, the remote computer can be connected to a user computer through any kind of network, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The computer-readable program instructions may be executed by the electronic circuit to implement various aspects of the present disclosure.

Various aspects of the present disclosure are described here with reference to the flowcharts and/or block diagrams of the method, apparatus (system), and computer program product according to the embodiments of the present disclosure. It should be understood that each block in the flowcharts and/or block diagrams as well as a combination of blocks in the flowcharts and/or block diagrams may be implemented by using the computer-readable program instructions.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause the computer, the programmable data processing apparatus, and/or another device to operate in a particular manner, such that the computer-readable medium storing the instructions includes a manufactured product, which includes instructions for implementing various aspects of the functions/actions specified in one or more blocks in the flowcharts and/or block diagrams.

The computer-readable program instructions may also be loaded onto a computer, another programmable data processing apparatus, or another device, such that a series of operation steps are performed on the computer, another programmable data processing apparatus, or another device to produce a computer-implemented process. Thus, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of the system, method, and computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions noted in the blocks may occur in a sequence different from that shown in the figures. For example, any two blocks presented in succession may actually be executed substantially in parallel, or they may sometimes be executed in a reverse sequence, depending on the functions involved. It should be further noted that each block in the block diagrams and/or flowcharts as well as a combination of blocks in the block diagrams and/or flowcharts may be implemented by using a dedicated hardware-based system executing specified functions or actions, or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skills in the art without departing from the scope and spirit of various illustrated embodiments. The selection of terms used herein is intended to best explain the principles and practical applications of the embodiments or technological improvements of the technologies on the market, or to cause other persons of ordinary skills in the art to understand the embodiments disclosed herein.

The invention claimed is:

1. A method for storage management, comprising:
   determining a first group of storage disks from a plurality of storage disks, a use rate denoting a proportion of occupied space in each storage disk of the first group of storage disks being higher than a first threshold, the first group of storage disks comprising a first group of storage blocks corresponding to a first redundant array of independent storage disks (RAID);
   allocating a second group of storage blocks corresponding to a second RAID from a second group of storage disks of the plurality of storage disks, the second group of storage blocks having the same size as that of the first group of storage blocks, a use rate denoting a proportion of occupied space in each storage disk of the second group of storage disks being less than a second threshold, wherein the second threshold comprises an average use rate of the plurality of storage disks;
   moving data in the first group of storage blocks to the second group of storage blocks;
   releasing the first group of storage blocks from the first group of storage disks; and
   wherein determining the first group of storage disks comprises:
      determining a third group of storage disks from the plurality of storage disks, the number of storage disks of the third group of storage disks being identical to a number of reference storage disks corresponding to the first RAID, a use rate denoting a proportion of occupied space in the third group of storage disks being higher than a third threshold,
      determining a fourth group of storage disks from the plurality of storage disks, the number of storage disks of the fourth group of storage disks being identical to the number of reference storage disks, a use rate denoting a proportion of occupied space in the fourth group of storage disks being lower than a fourth threshold, and
      determining the first group of storage disks from the plurality of storage disks in response to a difference between an average use rate denoting an average proportion of occupied space in the third group of storage disks and an average use rate denoting an average proportion of occupied space in the fourth group of storage disks being greater than a difference threshold.

2. The method according to claim 1, further comprising:
   determining a first storage disk from the plurality of storage disks, a use rate denoting a proportion of occupied space in the first storage disk being higher than a preset target use rate;
   allocating a standby storage block in a second storage disk of the plurality of storage disks, a use rate denoting a proportion of occupied space in the second storage disk being lower than the target use rate;
   moving data of a to-be-adjusted storage block in the first storage disk to the standby storage block; and
   releasing the to-be-adjusted storage block from the first storage disk.

3. The method according to claim 2, wherein the determining a first storage disk comprises:
   determining a fifth group of storage disks from the plurality of storage disks, a use rate denoting a proportion of occupied space in each storage disk of the fifth group of storage disks being higher than the first threshold;
   wherein each storage block of a group of storage blocks corresponding to the third RAID is located in the fifth group of storage disks; and
   determining the first storage disk from the plurality of storage disks.

4. The method according to claim 2, wherein the to-be-adjusted storage block is associated with a fourth RAID, wherein the moving data of a to-be-adjusted storage block to the standby storage block comprises:
   copying the data in the to-be-adjusted storage block to the standby storage block; and
   associating the standby storage block with the fourth RAID.

5. The method according to claim 4, further comprising:
   determining a total number of to-be-adjusted storage blocks by determining a total number of used storage blocks in individual disks of the plurality of storage disks exceeding an average number of used storage blocks in the plurality of storage disks.

6. The method according to claim 5, further comprising:
   determining a progress of completed adjustment based on the total number of to-be-adjusted storage blocks and a number of adjusted storage blocks; and
   providing the progress of completed adjustment to a user.

7. The method according to claim 1, further comprising:
   setting the second threshold to be less than the first threshold.

8. The method according to claim 1, wherein the first threshold comprises the average use rate of the plurality of storage disks.

9. The method according to claim 8, wherein determining the first group of storage disks from the plurality of storage disks is performed in response to determining that a difference between i) an average use rate denoting an average proportion of occupied space in each storage disk of the first group of storage disks and ii) the average use rate of the plurality of storage disks, is greater than a difference threshold.

10. A device for storage management, comprising:
    at least one processing unit; and
    at least one memory, the at least one memory being coupled to the at least one processing unit and storing instructions to be executed by the at least one processing unit, the instructions, when executed by the at least one processing unit, causing the device to execute an action, the action comprising:
       determining a first group of storage disks from a plurality of storage disks, a use rate denoting a proportion of occupied space in each storage disk of the first group of storage disks being higher than a first threshold, the first group of storage disks comprising a first group of storage blocks corresponding to a first redundant array of independent storage disks (RAID);
       allocating a second group of storage blocks corresponding to a second RAID from a second group of storage disks of the plurality of storage disks, the second group of storage blocks having the same size as that of the first group of storage blocks, a use rate denoting a proportion of occupied space in each storage disk of the second group of storage disks being less than a second threshold, wherein the second threshold comprises an average use rate of the plurality of storage disks;

moving data in the first group of storage blocks to the second group of storage blocks;

releasing the first group of storage blocks from the first group of storage disks; and wherein determining the first group of storage disks comprises:

determining a third group of storage disks from the plurality of storage disks, the number of storage disks of the third group of storage disks being identical to a number of reference storage disks corresponding to the first RAID, a use rate denoting a proportion of occupied space in the third group of storage disks being higher than a third threshold, determining a fourth group of storage disks from the plurality of storage disks, the number of storage disks of the fourth group of storage disks being identical to the number of reference storage disks, a use rate denoting a proportion of occupied space in the fourth group of storage disks being lower than a fourth threshold, and determining the first group of storage disks from the plurality of storage disks in response to a difference between an average use rate denoting an average proportion of occupied space in the third group of storage disks and an average use rate denoting an average proportion of occupied space in the fourth group of storage disks being greater than a difference threshold.

11. The device according to claim 10, wherein the action further comprises:

determining a first storage disk from the plurality of storage disks, a use rate denoting a proportion of occupied space in the first storage disk being higher than a preset target use rate;

allocating a standby storage block in a second storage disk of the plurality of storage disks, a use rate denoting a proportion of occupied space in the second storage disk being lower than the target use rate;

moving data of a to-be-adjusted storage block in the first storage disk to the standby storage block; and releasing the to-be-adjusted storage block from the first storage disk.

12. The device according to claim 11, wherein the determining a first storage disk comprises:

determining a fifth group of storage disks from the plurality of storage disks, a use rate denoting a proportion of occupied space in each storage disk of the fifth group of storage disks being higher than the first threshold;

wherein each storage block of a group of storage blocks corresponding to the third RAID is located in the fifth group of storage disks; and determining the first storage disk from the plurality of storage disks.

13. The device according to claim 11, wherein the to-be-adjusted storage block is associated with a fourth RAID, wherein the moving data of a to-be-adjusted storage block to the standby storage block comprises:

copying the data in the to-be-adjusted storage block to the standby storage block; and associating the standby storage block with the fourth RAID.

14. A computer program product, the computer program product being stored in a non-transitory computer storage medium and comprising machine-executable instructions, the machine-executable instructions, when running in a device, causing the device to execute an action, the action comprising:

determining a first group of storage disks from a plurality of storage disks, a use rate denoting a proportion of occupied space in each storage disk of the first group of storage disks being higher than a first threshold, the first group of storage disks comprising a first group of storage blocks corresponding to a first redundant array of independent storage disks (RAID);

allocating a second group of storage blocks corresponding to a second RAID from a second group of storage disks of the plurality of storage disks, the second group of storage blocks having the same size as that of the first group of storage blocks, a use rate denoting a proportion of occupied space in each storage disk of the second group of storage disks being less than a second threshold, wherein the second threshold comprises an average use rate of the plurality of storage disks;

moving data in the first group of storage blocks to the second group of storage blocks;

releasing the first group of storage blocks from the first group of storage disks; and wherein determining the first group of storage disks comprises:

determining a third group of storage disks from the plurality of storage disks, the number of storage disks of the third group of storage disks being identical to a number of reference storage disks corresponding to the first RAID, a use rate denoting a proportion of occupied space in the third group of storage disks being higher than a third threshold, determining a fourth group of storage disks from the plurality of storage disks, the number of storage disks of the fourth group of storage disks being identical to the number of reference storage disks, a use rate denoting a proportion of occupied space in the fourth group of storage disks being lower than a fourth threshold, and determining the first group of storage disks from the plurality of storage disks in response to a difference between an average use rate denoting an average proportion of occupied space in the third group of storage disks and an average use rate denoting an average proportion of occupied space in the fourth group of storage disks being greater than a difference threshold.

15. The computer program product according to claim 14, wherein the action further comprises:

determining a first storage disk from the plurality of storage disks, a use rate denoting a proportion of occupied space in the first storage disk being higher than a preset target use rate;

allocating a standby storage block in a second storage disk of the plurality of storage disks, a use rate denoting a proportion of occupied space in the second storage disk being lower than the target use rate;

moving data of a to-be-adjusted storage block in the first storage disk to the standby storage block; and releasing the to-be-adjusted storage block from the first storage disk.

16. The computer program product according to claim 15, wherein the determining a first storage disk comprises:

determining a fifth group of storage disks from the plurality of storage disks, a use rate denoting a proportion of occupied space in each storage disk of the fifth group of storage disks being higher than the first threshold;

wherein each storage block of a group of storage blocks corresponding to the third RAID is located in the fifth group of storage disks; and determining the first storage disk from the plurality of storage disks.

17. The computer program product according to claim 15, wherein the to-be-adjusted storage block is associated with a fourth RAID, wherein the moving data of a to-be-adjusted storage block to the standby storage block comprises:

copying the data in the to-be-adjusted storage block to the standby storage block; and associating the standby storage block with the fourth RAID.

* * * * *